(12) United States Patent
Peterson et al.

(10) Patent No.: US 10,712,906 B2
(45) Date of Patent: Jul. 14, 2020

(54) SYSTEMS AND METHODS FOR PRESENTATION OF ELEMENTS ON A DISPLAY BASED ON CONTEXT

(71) Applicant: Lenovo (Singapore) Pte. Ltd., New Tech Park (SG)

(72) Inventors: Nathan J. Peterson, Oxford, NC (US); Russell Speight Vanblon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 303 days.

(21) Appl. No.: 15/163,904

(22) Filed: May 25, 2016

(65) Prior Publication Data

US 2017/0344194 A1    Nov. 30, 2017

(51) Int. Cl.
*G06F 3/0482* (2013.01)
*G06F 3/0487* (2013.01)
*G06F 9/451* (2018.01)

(52) U.S. Cl.
CPC .......... *G06F 3/0482* (2013.01); *G06F 3/0487* (2013.01); *G06F 9/451* (2018.02)

(58) Field of Classification Search
CPC ..... G06F 3/0482; G06F 3/0481; G06F 3/0484
See application file for complete search history.

(56) References Cited

U.S. PATENT DOCUMENTS

| | | | | |
|---|---|---|---|---|
| 9,658,738 B1* | 5/2017 | Park | ..................... | G06F 3/04817 |
| 2006/0190825 A1* | 8/2006 | Zaag | ................. | H04M 1/72572 |
| | | | | 715/745 |
| 2007/0276295 A1 | 11/2007 | Shugg | | |
| 2010/0223047 A1 | 9/2010 | Christ | | |
| 2011/0072492 A1 | 3/2011 | Mohler et al. | | |
| 2012/0117499 A1* | 5/2012 | Mori | ................. | H04M 1/72569 |
| | | | | 715/765 |
| 2013/0014040 A1* | 1/2013 | Jagannathan | .......... | G06Q 50/01 |
| | | | | 715/765 |
| 2013/0173513 A1* | 7/2013 | Chu | ........................ | G06F 9/445 |
| | | | | 706/14 |
| 2013/0212487 A1 | 8/2013 | Cote | | |

(Continued)

FOREIGN PATENT DOCUMENTS

| CN | 102187296 A | 9/2011 |
|---|---|---|
| CN | 103135688 A | 6/2013 |
| CN | 103384284 A | 11/2013 |

OTHER PUBLICATIONS

Suzanne Marion Beaumont, Russell Speight Vanblon, Paul Plaskonos, Jon Wayne Haim, Greyson Craig Davis, Mark David Krynock, "Presenting Elements Based on Configuration of Device", related U.S. Appl. No. 14/204,181, Applicant's response to Final Office Action filed Apr. 26, 2017.

(Continued)

*Primary Examiner* — Asher D Kells
(74) *Attorney, Agent, or Firm* — John M. Rogitz; John L. Rogitz (57) ABSTRACT

In one aspect, a device includes a processor, a display accessible to the processor, and storage accessible to the processor. The storage bears instructions executable by the processor to identify at least one context associated with a device and present, on the display and at least in part based on the at least one context, a first arrangement of elements.

20 Claims, 5 Drawing Sheets

(56) References Cited

U.S. PATENT DOCUMENTS

| | | |
|---|---|---|
| 2013/0249785 A1 | 9/2013 | Alameh |
| 2014/0075385 A1* | 3/2014 | Wan .................. G06Q 10/1093 |
| | | 715/812 |
| 2014/0123022 A1* | 5/2014 | Lee .................. H04M 1/72566 |
| | | 715/747 |
| 2014/0210703 A1 | 7/2014 | Narasimhan et al. |
| 2014/0215201 A1 | 7/2014 | Pfeifer |
| 2014/0289652 A1* | 9/2014 | Cai ........................ G06F 9/445 |
| | | 715/762 |
| 2015/0106737 A1* | 4/2015 | Montoy-Wilson ...... G06F 9/451 |
| | | 715/745 |
| 2015/0339400 A1* | 11/2015 | Choi ................ G06F 17/30884 |
| | | 715/747 |
| 2016/0077715 A1* | 3/2016 | Kasterstein ....... G06F 17/30864 |
| | | 715/747 |
| 2016/0196048 A1* | 7/2016 | Khoury ............... G06F 3/04845 |
| | | 715/761 |
| 2016/0246478 A1* | 8/2016 | Davis ................ H04M 1/72569 |
| 2016/0357362 A1* | 12/2016 | Gauci ..................... G06F 9/451 |
| 2017/0115848 A1* | 4/2017 | Plasmeier ............. G06F 3/0488 |

OTHER PUBLICATIONS

Suzanne Marion Beaumont, Russell Speight Vanblon, Paul Plaskonos, Jon Wayne Heim, Greyson Craig Davis, Mark David Krynock, "Presenting Elements Based on Configuration of Device", related U.S. Appl. No. 14/204,181, Final Office Action dated Jan. 26, 2017.

Suzanne Marion Beaumont, Russell Speight Vanblon, Paul Plaskonos, Jon Wayne Heim, Greyson Craig Davis, Mark David Krynock, "Presenting Elements Based on Configuration of Device", related U.S. Appl. No. 14/204,181, Applicant's response to non-final office action filed Oct. 12, 2016.

Suxanne Marion Beaumont, Russell Speigh Vanblon, Paul Plaskonos, Jon Wayne Heim, Greyson Craig Davis, Mark David Krynock, "Presenting Elements Based on Configuration of Device", file history of related pending U.S. Appl. No. 14/204,181, filed Mar. 11, 2014.

Suzanne Marion Beaumont, Russell Speight Vanblon, Paul Plaskonos, Jon Wayne Heim, Greyson Craig Davis, Mark David Krynock, "Presenting Elements Based on Configuration of Device", related U.S. Appl. No. 14/204,181, Non-Final Office Action dated Jul. 13, 2016.

Suzanne Marion Beaumont, Russell Speight Vanblon, Paul Plaskonos, Jon Wayne Heim, Greyson Craig Davis, Mark David Krynock, "Presenting Elements Based on Configuration of Device", related U.S. Appl. No. 14/204,181, Examiner's Answer dated Dec. 21, 2017.

Suzanne Marion Beaumont, Russell Speight Vanblon, Paul Plaskonos, Jon Wayne Heim, Greyson Craig Davis, Mark David Krynock, "Presenting Elements Based on Configuration of Device", related U.S. Appl. No. 14/204,181, Reply Brief filed Feb. 20, 2018.

* cited by examiner

SYSTEMS AND METHODS FOR PRESENTATION OF ELEMENTS ON A DISPLAY BASED ON CONTEXT

FIELD

The present application relates generally to systems and methods for presentation of elements on a display based on context.

BACKGROUND

As recognized herein, many devices in the marketplace today statically present a set of icons on a display. However, as also recognized herein, it may be annoying at times to scroll through those icons to reach a particular one a user desires to select in a given instance.

SUMMARY

Accordingly, in one aspect a device includes a processor, a display accessible to the processor, and storage accessible to the processor. The storage bears instructions executable by the processor to identify a location of the device and, based on the identification, present on the display at least two selectors in a first arrangement.

In another aspect, a method includes identifying at least one context associated with a device and presenting a first arrangement of elements on a display at least in part based on the at least one context.

In still another aspect, an apparatus includes a first processor, a network adapter, and storage. The storage bears instructions executable by a second processor of a device for identifying situational data and, based at least in part on the identifying, presenting a particular arrangement of elements on a display of the device. The first processor transfers the instructions to the device over a network via the network adapter.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
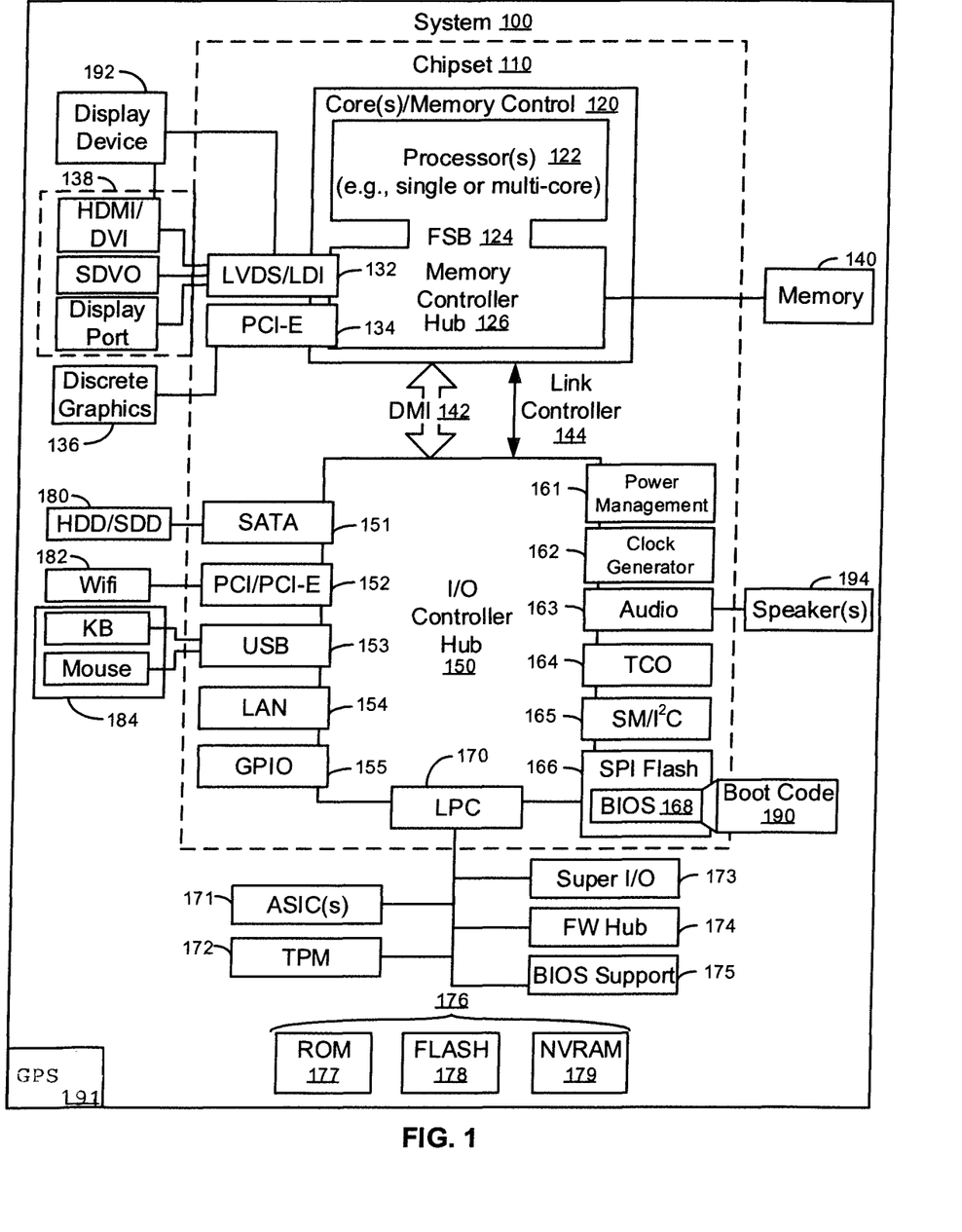
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include a GPS transceiver 191 that is configured to receive geographic position information from at least one satellite and provide the information to the processor 122. However, it is to be understood that another suitable position receiver other than a GPS receiver may be used in accordance with present principles to determine the location of the system 100.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
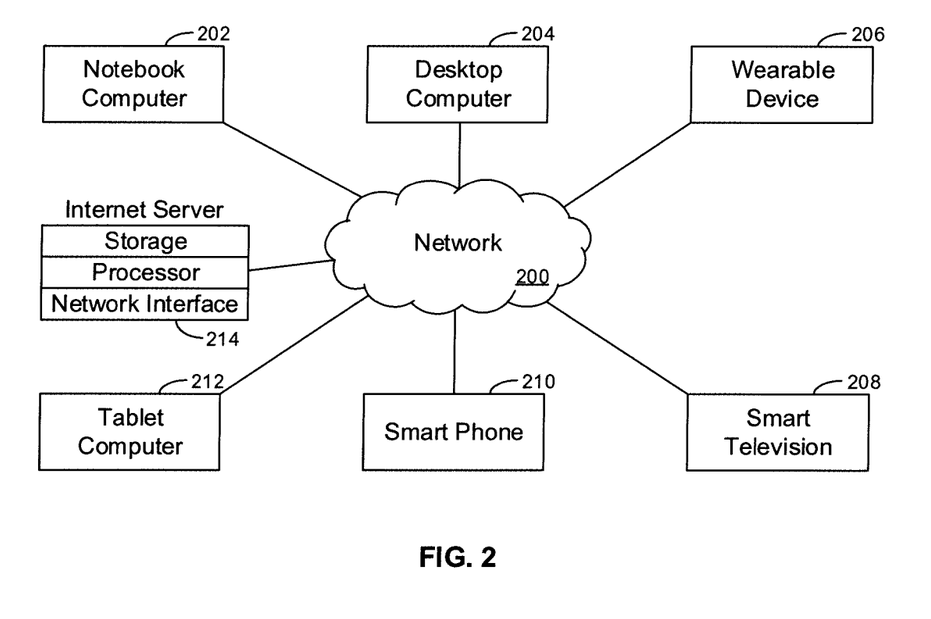
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
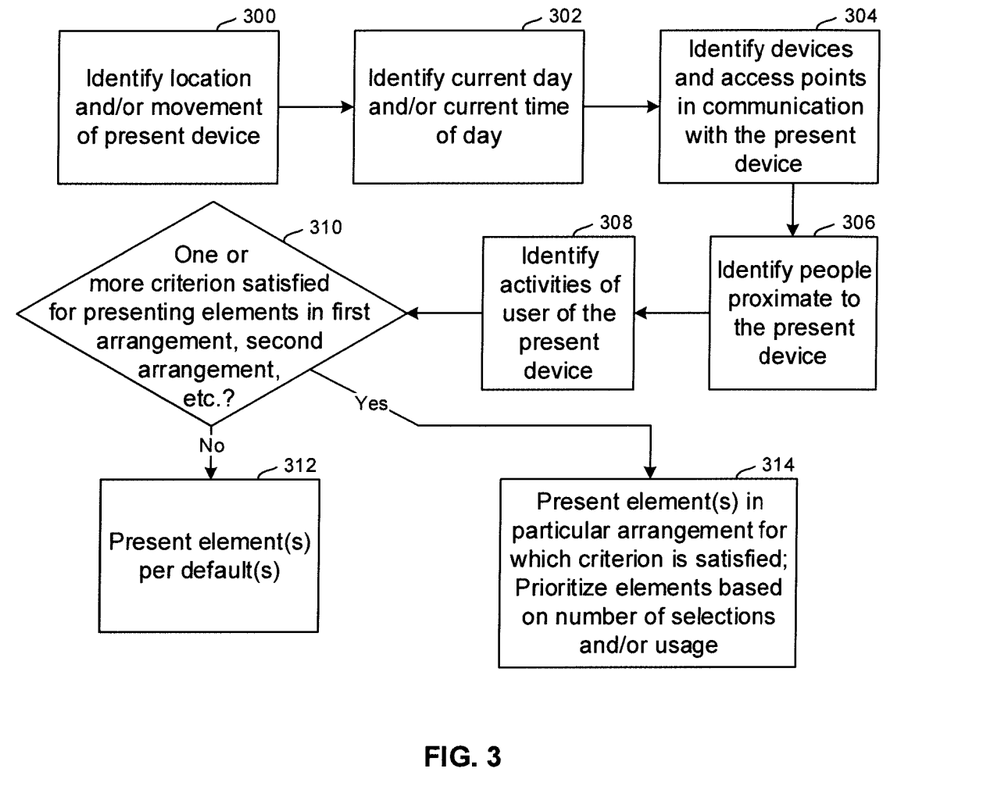
FIG. 3 is a flow chart of an example algorithm in accordance with present principles.

Referring to FIG. 3, it shows example logic that may be executed by a device such as the system 100 (referred to when describing FIG. 3 as the "present device") for determining which selectors and/or elements to present on a display based on one or more contexts and/or situational data in accordance with present principles. Beginning at block 300, the logic may identify a location of the present device, which may be a first context and/or piece of situational data in accordance with present principles. The logic may identify the location, for example, based on GPS coordinates from a GPS transceiver on the present device, based on the present device communicating over a particular Wi-Fi or other wireless network associated with a particular location, based on the present device communicating with other devices associated with a particular location, and/or based on user input indicating a particular location. Additionally or alternatively, the logic may identify the location of the present device by executing a received signal strength indication (RSSI) algorithm on received wireless signals (e.g., near field communication (NFC), Bluetooth, or Wi-Fi signals) from devices having known locations to thus identify a particular location of the present device based on the known locations of the other devices and the strength of signals from those devices.

Also at block 300, the logic may identify movement of the present device, such as movement of the present device from a user's personal residence to the user's work location. Movement may be a second context and/or situational data in accordance with present principles. Movement may be identified based on input from the present device's GPS transceiver indicating a change in GPS coordinates of the present device, as well as based on input from a gyroscope and/or accelerometer measuring movement of the present device. In some embodiments, movement of the present device may also be identified as being in a particular direction using so-called "dead reckoning" where data from the accelerometer may be processed to determine movement of the present device in a particular direction based on acceleration and/or velocity vectors derived from the input.

From block 300 the logic may move to block 302. At block 302 the logic may identify a current day (e.g., of the week, of the month, of the year, etc.) and a current time of day, where the current day may be a third context and/or situational data and the current time of day and/or a current time of day time range may be a fourth context and/or situational data in accordance with present principles. The logic may identify both of these pieces of information based on data in an electronic calendar accessible to the present device, based on data from a clock or time application executing at the present device, based on data accessed over the Internet, etc.

From block 302 the logic may move to block 304 where the logic may identify other devices and/or access points (e.g., Wi-Fi or Bluetooth access points) as communicating with or establishing communication with the present device, which may be a fifth context and/or situational data in accordance with present principles. The logic may identify the other devices and/or access points based on wired or wireless signals received at the present device from those devices.

After block 304 the logic may move to block 306, where the logic may identify one or more people proximate to the device, where people that are proximate to the present device may be a sixth context and/or situational data in accordance with present principles. The people may include a user associated with the present device and other people besides the user. The logic may identify the people by receiving images from a camera (such as one on the present device) and executing facial recognition on the images to identify the people. Other types of biometric identification may be used as well, such as fingerprint identification or retina identification.

Further, in some embodiments people may be identified by receiving audio input from a microphone (such as one on the present device) and executing voice recognition on the audio input to identify the particular person. Additionally or alternatively, the logic may identify people based on user input indicating that a particular person is present. People may also be identified based on based on recognition of wireless signals received at the present device as being from another device associated with a particular person.

Still further, people may be identified based on a person's device being identified as being proximate to (e.g., within a threshold distance of) the present device and/or a location of the present device, as may be identified based on location information (such as GPS coordinates) pertaining to that device that may be identified by the present device and/or received from the other device. RSSI may also be used to identify a location of another device associated with a particular person relative to the location of the present device. Thus, in some examples the present device may assume people are adjacent to and/or at their respective devices, so that people may be identified by identifying their respective personal devices.

Still in reference to FIG. 3, from block 306 the logic may proceed to block 308. At block 308 the logic may identify one or more activities of a user of the present device, such as current activities and upcoming activities. A particular activity or an activity type may be a seventh context and/or situational data in accordance with present principles. The logic may identify activities based on which application or feature on the present device the user is currently using. The logic may also identify activities based on a history of user activities accessible to the present device from which similar current and future activities may be predicted to occur based on them occurring in the past at similar days and times, as indicated in the history. Additionally, the logic may identify activities by accessing an electronic calendar associated with the user and identifying activities noted in the electronic calendar.

From block 308 the logic may proceed to decision diamond 310. At diamond 310 the logic may determine, based on one or more of the identifications at blocks 300-308, whether one or more criteria have been satisfied for presenting elements, icons, images, selectors, etc. (referred to below merely as "elements" for simplicity) on a display in a first arrangement, or a second arrangement, or an Nth arrangement. A negative determination may cause the logic to move to block 312, where the logic may present one or more elements according to a default arrangement or configuration, where the elements may be presented as part of a home screen of the present device or an applications list of the present device per device defaults.

However, responsive to an affirmative determination at diamond 310, the logic may instead move to block 314. At block 314 the logic may present one or more elements in a particular arrangement for which at least one criterion has been satisfied, where in some embodiments the presentation may occur responsive to display activation and/or an unlocking of the present device. Thus, it is to be understood that various different arrangements of elements on a display may be selected based on the contexts and/or situational data identified at blocks 300-308, and/or criterions that may be satisfied based on these identifications, where the selections may be made, e.g., based on data in a relational database correlating contexts (and/or situational data) to element arrangements.

For example, if the present device identifies that it is at a location associated with the user's personal residence, the context and/or situational data of being at the user's personal residence may satisfy a criterion for presenting a first arrangement on the present device's display. As another example, if the current day and time are a weekday at 9:00 a.m., that may satisfy a criterion for presenting a second arrangement on the present device's display. If the user's spouse's device is identified as being within a threshold distance to the present device, that may satisfy a criterion for presenting a third arrangement on the display. As yet another example, if a friend of the user is identified as being within a threshold distance to the present device, that may satisfy a criterion for presenting a fourth arrangement on the display. Still further, if the user is identified as traveling, that may satisfy a criterion for presenting a fifth arrangement on the display.

For each arrangement, elements that are to be presented may have their presentation prioritized from top to bottom, left to right (for example) based on a number of times the element and/or corresponding application associated therewith has been selected or used (where, e.g., each was selected/used at least a threshold number of times in the past during the same context and/or situation), with elements having a higher number of selections being prioritized over elements with a lower number of elements. Additionally or alternatively, for each arrangement, elements that are to be presented may have their presentation prioritized from top to bottom, left to right (for example) based on a length of time each application associated with a respective element was used/executed in the past during the same context and/or situation, with elements having a longer length of use being prioritized over elements with a lower length of use. Still further, a user may establish each element's juxtaposition within a given arrangement.

As an example, suppose a selection threshold is three. If the user has selected a movie streaming element associated with a movie streaming application at least five times while at their personal residence, and has selected an email element associated with an email application three times while at their personal residence, the movie streaming element may be presented on the display, relative to being viewed right side up, above and/or to the left of the email element, while another element selected only two times while at the personal residence may not be presented at all based on a determination by the present device that the user is at their personal residence.

Elements that are to be included for a given arrangement may be determined in the first place based on user input indicating that one or more elements should be presented when a particular context and/or situation is identified and/or criterion is met. Elements may also be determined for presentation in a given arrangement based on lengths of use of respective applications associated with the elements while a particular context and/or situation exists (such as the present device being at a particular location), with elements for longer-used applications being presented above and/or to the left of elements used relatively less. A minimum length of use threshold may be used in some examples, where only elements respectively associated with applications executed/used in a given context and/or situation for at least a threshold length of time may be presented. If there is not enough room on the display to present all elements for which the threshold length of time for corresponding applications has been met for a given context and/or situation, elements for applications with relatively less lengths of use may be presented only if there is space remaining on the display to present them after presenting ones with higher lengths of use.

Additionally or alternatively, elements may be determined for a given arrangement based on them (and/or their corresponding applications) being selected a threshold number of times, where elements associated with applications having a higher number of selections may be presented before elements associated with applications having a lower number of selections but still above the threshold. If there is not enough room on the display to present all elements for which the threshold has been met for a given context and/or situation, elements corresponding to applications with lower numbers of selections may be presented only if there is space remaining on the display to present them after presenting ones for applications with higher numbers of selections.

Further still, in instances where the logic at diamond 310 determines that plural criterions have been satisfied for presenting elements of different arrangements, one of the arrangements or another may be selected for presentation based on a predefined and/or user-defined weighting of one arrangement (and/or corresponding context/situation) over another. In other embodiments, individual elements from each arrangement may be selected for a hybrid arrangement similar to as set forth above, such as based on user input, based on a length of use of corresponding applications, based on a number of selections/uses, etc. For example, if it is determined that criterions are met for presenting two different arrangements, elements associated with applications selected the most number of times may be selected from each arrangement for presentation before elements are selected for presentation from either arrangement that are associated with applications selected relatively less.

Further still, note that in embodiments where there is enough room on the display to present all elements from both arrangements, all elements may be presented in their respective arrangements but, e.g., with one arrangement being presented on one portion of the display and the other arrangement presented on another portion of the display. In other embodiments where there is enough room on the display to present all elements from both arrangements, the elements may be mixed amongst each other and prioritized from top to bottom, left to right as set forth above (e.g., based on a length of use of corresponding applications and/or based on a number of selections/uses).

Figure 4:
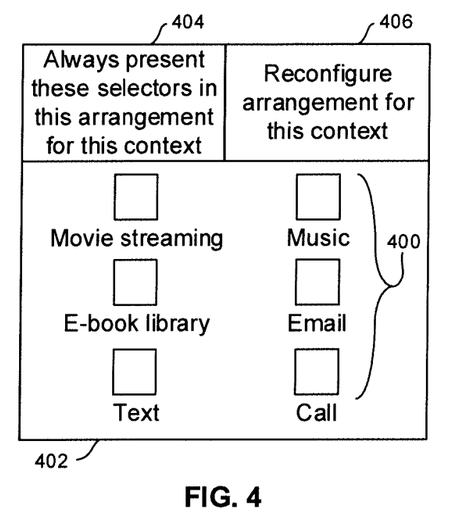
FIGS. 4-10 show example user interfaces (UIs) in accordance with present principles.
Figure 5:
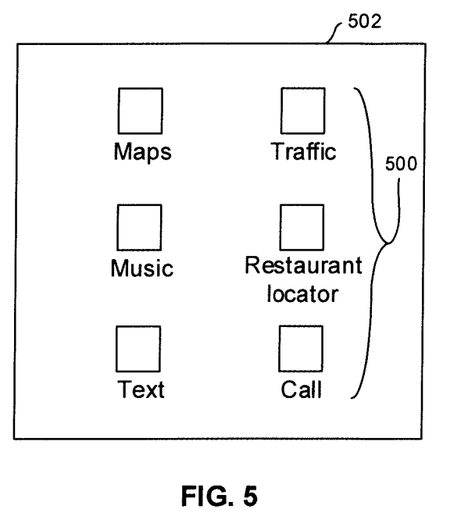
Figure 6:
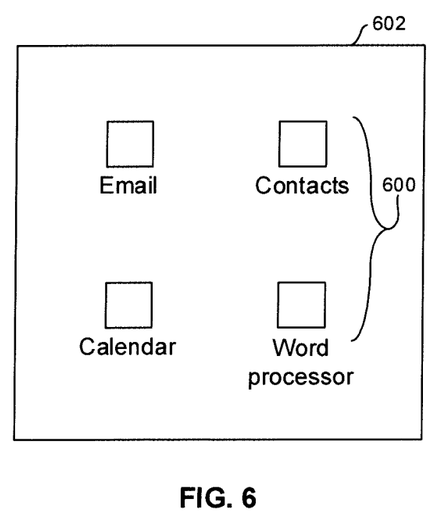

FIGS. 4-6 show various example arrangements of elements presented on respective user interfaces (UIs), where the UIs themselves are understood to be presentable on a display controlled by a device undertaking present principles. The arrangements shown may establish a dynamically determined/arranged home screen of a device in accordance with present principles, and/or a dynamically determined/arranged applications list in accordance with present principles. The respective elements to be discussed below may be established in example embodiments as selectors, icons, and/or tiles respectively associated with different applications. The elements may be selectable to launch or initiate their corresponding applications, and/or to present UIs associated with their corresponding applications.

FIG. 4 shows a first example arrangement 400 presented on a UI 402. The arrangement 400 may be presented responsive to determining, for example, that a user is at his or her personal residence. As may be appreciated from FIG. 4, a movie streaming application element is presented in an upper left portion, a music application element is presented in an upper right portion, an e-book application element is presented in a middle left position, an email application element is presented in a middle right position, a text application element is presented in a bottom left position, and a call/telephone application element is presented in a bottom right position.

The UI 402 also shows selectors 404 and 406. Selector 404 may be selected by a user to automatically without further user input configure the device presenting the UI 402 to always present the elements in the arrangement 400 shown for the context and/or situation identified by the present device, which in this case is the user being located at his or her personal residence. Selector 406 may be selected to enter an edit mode in which the user may rearrange the elements of the arrangement 400 relative to each other as presented on the display, and establish that rearrangement as the one to be presented responsive to the device determining that the user is at his or her personal residence. In the edit mode the user may also add or remove elements from the arrangement 400. It is to be understood that selectors respectively similar to the selectors 404 and 406 may be presented on the UIs shown in FIGS. 5 and 6 as well, mutatis mutandis, though they have been omitted from FIGS. 5 and 6 for clarity.

FIG. 5 shows a second example arrangement 500 presented on a UI 502. The arrangement 500 may be presented responsive to determining, for example, that a user is away from a city in which they live and is traveling. As may be appreciated from FIG. 5, a maps application element is presented in an upper left portion, a traffic application element is presented in an upper right portion, a music application element is presented in a middle left position, a restaurant locator application element is presented in a middle right position, a text application element is presented in a bottom left position, and a call/telephone application element is presented in a bottom right position.

FIG. 6 shows a third example arrangement 600 presented on a UI 602. The arrangement 600 may be presented responsive to determining, for example, that the current day is a Monday and the current time is 2:00 p.m. As may be appreciated from FIG. 6, an email application element is presented in an upper left portion, a contacts application element is presented in an upper right portion, a calendar application element is presented in a bottom left position, and a word processing application element is presented in a bottom right position. Note that while six elements are presented in the arrangements 400 and 500, four elements are presented in the arrangement 600, which may be because, for example, those four elements are associated with applications that have been executed a threshold number of times on Mondays during 2:00 p.m. while no other applications have. In other embodiments, this may be because the user has provided input that only the four elements shown should be presented for that arrangement.

Figure 7:
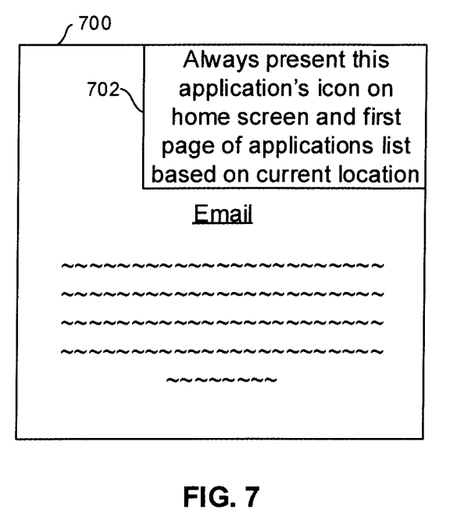

Now in reference to FIG. 7, it shows an example UI 700 associated with an email application. In example embodiments, the UI 700 may be a UI for presenting an email received at an email account associated with a user. The UI 700 includes a selector 702 that is selectable to configure a device undertaking present principles to always present an element associated with the email application on both a first page of a home screen of elements and on a first page of an applications list when the device identifies a context of the user and/or device as being located at the location at which it is currently. Additionally, though not shown for clarity, in some embodiments the UI 700 may include another selector that is selectable to configure the device to never present the element associated with the email application when the device identifies the context of the user and/or device as being located at the location at which it is currently.

Figure 8:
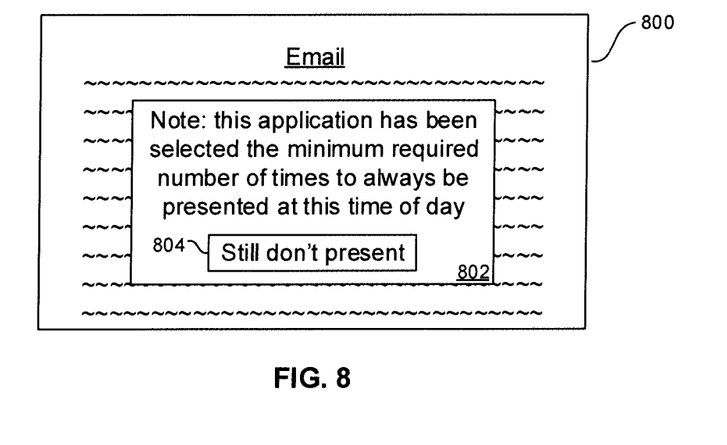

FIG. 8 shows an example UI 800 also associated with the email application, and in some embodiments it may also be a UI for presenting an email received at an email account associated with the user. FIG. 8 also shows a prompt 802 overlaid on the UI 800. The prompt 802 may be presented responsive to the email application being selected a threshold number of times for an identified context and/or situation, in this case an identified time of day. Thus, the prompt 802 may indicate that the email application has been selected the threshold number of times at the current time of day and may also indicate that its associated selector will "always" be presented at the current time of day (e.g., at least until the user provides input that it should not be presented, until other elements/applications reach a higher prioritization level, etc.).

In some embodiments, the prompt 802 may include a selector 804 that is selectable to automatically without further user input configure the device to not present the element corresponding to the email application based on the current time of day. Thus, based on user selection of selector 804, the device will decline to present an email application element on its display for a given arrangement associated with the current time of day despite the email application being selected the threshold number of times at that time of day.

Note that prompts similar to the prompt 802 may be presented in other instances based on other thresholds being met as described herein, mutatis mutandis, such as a prompt indicating that a threshold length of use in a given context and/or situation has been met along with a selector to nonetheless still not present an element based on the threshold length of use for a corresponding element being met.

Figure 9:
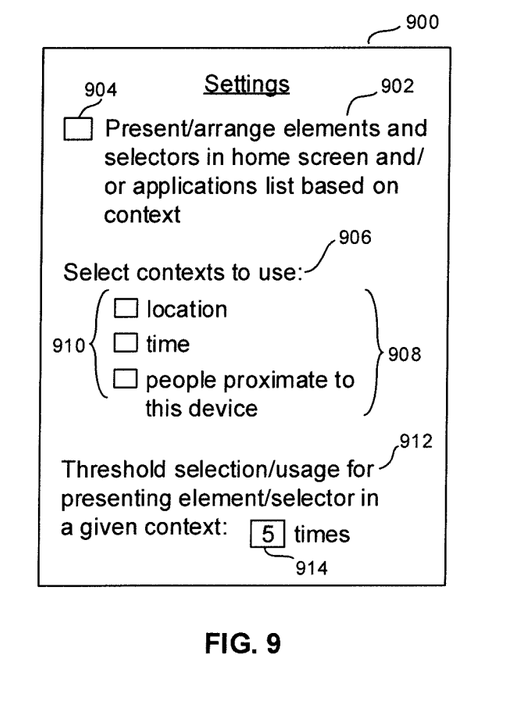

FIG. 9 shows an example settings UI 900 presentable on a display for configuring a device undertaking present principles. The UI 900 includes an option 902 for a user to select whether to present elements in particular arrangements based on context and/or situational data, and/or based on respective criteria being satisfied, where a user may configure the device to do so in accordance with present principles based on selection of check box 904.

The UI 900 may also include an option 906 to select one or more types of context/situations for the device to identify when determining an arrangement of elements to present on the display. Each type 908 may be selected using a respective check box 910 juxtaposed adjacent thereto. Example types include location, time of day, and people proximate to the device. Though only three types are shown for simplicity, any type disclosed herein may be presented.

The UI 900 of FIG. 9 may also include an option 912 for a user to establish a threshold number of selections and/or uses of an application for the device to present a corresponding element in an element arrangement for a given context and/or situation. Thus, a number entry box 914 may be presented at which a user may enter a number to establish the threshold. In the present example, a threshold number of five has been entered by a user. Other similar options may also be presented to establish the other thresholds disclosed herein, though they have not been shown in FIG. 9 for simplicity.

Figure 10:
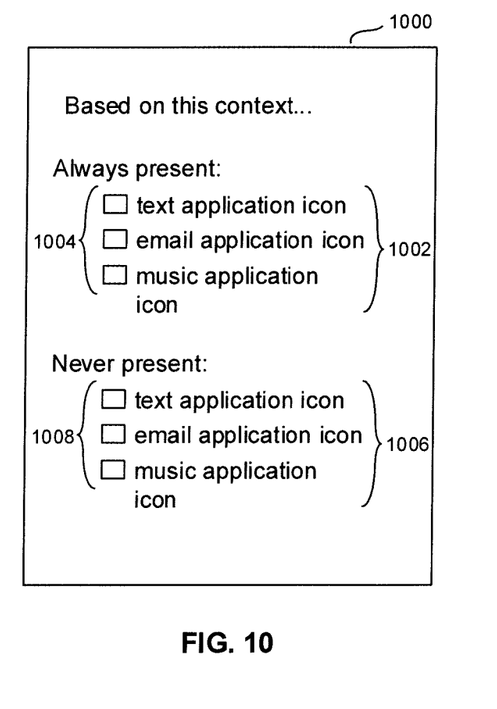

FIG. 10 shows a UI 1000 for a user to provide input for certain elements to be presented for an identified context and/or situation in accordance with present principles. Thus, the UI 1000 may be presented responsive to a first time that a particular context and/or situation is identified and/or based on user input to present it while in a certain context and/or situation. In some embodiments, the UI 1000 may even be presented responsive to selection of a selector such as the selector 406 described above.

In any case, the UI 1000 may include a first list 1002 of elements to present in a particular context/situation that has been identified, where each element in the list 1002 may be selected for presentation based on selection of a corresponding check box 1004 next to each element noted in the list 1002. The UI 1000 may also present a second list 1006 of elements to not present in the particular context/situation that has been identified, where each element in the list 1006 may be selected to "never" be presented in that context/situation based on selection of a corresponding check box 1008 next to each element noted in the list 1006 (such at least until the respective check box 1008 is deselected).

It is to be understood that in some embodiments in accordance with present principles, responsive to identification of a context/situation as existing for which a particular arrangement of elements should be presented, a device may automatically without additional user input launch or initiate the applications corresponding to the elements that are to be presented in that arrangement. Thus, when a user accesses his or her device and the particular arrangement is presented, the user may select one element or another and more quickly access the application itself since the application has already been launched.

It may now be appreciated that present principles provide for, e.g., application shortcuts on a desktop or home screen to be displayed or not displayed based on a context/situation, such as where the user is with his or her device. For example, while the user is at work, a device in accordance with present principles may not display a video game shortcut or a movie streaming shortcut that the user might use in a different context such as being at home. Display space is thus apportioned to shortcuts that the user may want while at work but not others the user may not want while at work. In some embodiments, a main applications list for a device may even be truncated down based on a given context, and/or shortcuts for the most used applications for that context may be moved up to the first pages of plural pages of the applications list.

Categories of context and/or situations may include, for example, time of day, whether the user is in a locality in which he or she lives, whether the user is traveling, whom the user is currently with, etc. For instance, if a user typically uses a social networking service while proximate to his or her spouse, a shortcut for the social networking service may be presented based on the device determining that the spouse is proximate.

As another example, if a user only uses a restaurant rating application while away from his or her home and work, while the user is at home and at work a device undertaking present principles may move a shortcut for the application off the home screen for the device and also not present it on a first page of an applications list for the device, but instead only present it on a later page of the home screen and/or applications list that is to be scrolled to from the initially-presented first page. Then, when the user is away from home and work, the shortcut may be presented on the first page of the home screen and/or applications list.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein.

What is claimed is:

1. A device, comprising:
   at least one processor;
   a display accessible to the at least one processor; and
   storage accessible to the at least one processor and bearing instructions executable by the at least one processor to:
   identify at least a first context associated with the device as currently existing;
   based on the identification, present on the display a first arrangement of selectors; and
   present a user interface (UI) on the display, the UI comprising a first list of items indicating respective selectors to not present while the first context exists, wherein each item from the first list is selectable to set the device to not present the respective selector while the first context exists, the UI comprising a second list of items indicating respective selectors to present while the first context exists, wherein each item from the second list is selectable to set the device to present the respective selector while the first context exists.

2. The device of claim 1, wherein the instructions are executable to:
   present the UI responsive to a first time that the first context is identified as currently existing.

3. The device of claim 1, wherein the instructions are executable to:
   present the UI responsive to user input to present the UI, the user input received while the first context currently exists.

4. The device of claim 1, wherein the selectors are icons respectively associated with different applications.

5. The device of claim 1, wherein the first arrangement of selectors comprises at least a first selector, wherein the first arrangement of selectors does not comprise a second selector different from the first selector, and wherein based on identification at least of the first context as currently existing the instructions are executable to move the second selector off of a home screen for the device and instead present the second selector on a different page of the device.

6. The device of claim 5, wherein based on identification of a second context different from the first context as currently existing the instructions are executable to present the second selector on the home screen.

7. The device of claim 1, wherein the first arrangement of selectors comprises at least a first selector, wherein the first arrangement of selectors does not comprise a second selector different from the first selector, and wherein based on identification at least of the first context as currently existing the instructions are executable to not present the second selector on a home screen for the device but to present the second selector on a page of an applications list, the page being different from the home screen.

8. The device of claim 1, wherein the first arrangement of selectors comprises at least a first selector, wherein the first arrangement of selectors does not comprise a second selector different from the first selector, and wherein based on identification at least of the first context as currently existing the instructions are executable to move the second selector off of a first page of an applications list for the device and instead present the second selector on a second page of the applications list, the second page being different from the first page, the second page being scrollable to from the first page.

9. The device of claim 1, wherein the first arrangement of selectors comprises at least a first selector, wherein the first arrangement of selectors does not comprise a second selector different from the first selector, and wherein based on identification at least of the first context as currently existing the instructions are executable to not present the second selector on a first page of an applications list for the device but to present the second selector on a second page of the applications list, the second page being different from the first page.

10. The device of claim 9, wherein based on identification of a second context different from the first context as currently existing the instructions are executable to present the second selector on the first page of the applications list.

11. The device of claim 9, wherein the device permits a user to scroll to the second page from the first page.

12. A method, comprising:
identifying at least a first context associated with a device that exists in a particular instance;
presenting, on a display and at least in part based on the identifying, a first arrangement of elements; and
presenting a user interface (UI) on the display, the UI comprising a first list of items indicating respective elements to not present while the first context exists, wherein each item from the first list is selectable to set the device to not present the respective element while the first context exists, the UI comprising a second list of items indicating respective elements to present while the first context exists, wherein each item from the second list is selectable to set the device to present the respective element while the first context exists.

13. The method of claim 12, comprising:
presenting the UI responsive to a first time that the first context is identified as existing.

14. The method of claim 12, wherein the elements are icons respectively associated with different applications.

15. The method of claim 12, wherein the first arrangement of elements comprises at least a first element, wherein the first arrangement of elements does not comprise a second element different from the first element, and wherein based on identifying at least the first context as existing the method comprises moving the second element off of a home screen for the device and instead presenting the second element on a different page of the device.

16. The method of claim 12, wherein the first arrangement of elements comprises at least a first element, wherein the first arrangement of elements does not comprise a second element different from the first element, and wherein based on identifying at least the first context as existing the method comprises not presenting the second element on a first page of an applications list for the device but presenting the second element on a second page of the applications list, the first page being different from the second page.

17. An apparatus, comprising:
a first processor;
a network adapter; and
storage bearing instructions executable by a second processor of a device for:
identifying at least a first context associated with the device that is currently occurring;
presenting, on a display and at least in part based on the identifying, a first arrangement of elements; and
presenting a user interface (UI) on the display, the UI comprising a first list of items associated with respective elements to not present while the first context is currently occurring, wherein each item from the first list is selectable to set the device to not present the respective element while the first context is currently occurring, the UI comprising a second list of items associated with respective elements to present while the first context is currently occurring, wherein each item from the second list is selectable to set the device to present the respective element while the first context is currently occurring;
wherein the first processor transfers the instructions to the device over a network via the network adapter.

18. The apparatus of claim 17, wherein the first arrangement of elements comprises at least a first element, wherein the first arrangement of elements does not comprise a second element different from the first element, and wherein based on identifying at least the first context as currently occurring the instructions are executable for not presenting the second element on a first page of an applications list for the device but presenting the second element on a second page of the applications list, the first page being different from the second page.

19. The apparatus of claim 17, wherein the elements are icons.

20. The apparatus of claim 19, wherein the icons are respectively associated with different applications.

* * * * *